United States Patent
López et al.

(10) Patent No.: US 8,194,839 B2
(45) Date of Patent: Jun. 5, 2012

(54) METHOD AND APPARATUS FOR CONTROLLING A PROVISIONING PROCESS IN A TELECOMMUNICATIONS SYSTEM

(75) Inventors: Maria Pilar González López, Madrid (ES); Fabian Castro Castro, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1294 days.

(21) Appl. No.: 11/721,721

(22) PCT Filed: Dec. 14, 2004

(86) PCT No.: PCT/SE2004/001869
§ 371 (c)(1),
(2), (4) Date: Sep. 18, 2007

(87) PCT Pub. No.: WO2006/065176
PCT Pub. Date: Jun. 22, 2006

(65) Prior Publication Data
US 2008/0165943 A1    Jul. 10, 2008

(51) Int. Cl.
*H04M 3/42* (2006.01)

(52) U.S. Cl. .................... 379/201.12; 379/219

(58) Field of Classification Search ............ 379/201.12, 379/201.01, 219
See application file for complete search history.

(56) References Cited

U.S. PATENT DOCUMENTS

| | | | |
|---|---|---|---|
| 5,661,789 A * | 8/1997 | Boyle et al. ............ | 379/207.02 |
| 6,104,798 A * | 8/2000 | Lickiss et al. ............ | 379/201.12 |

* cited by examiner

*Primary Examiner* — Curtis Kuntz
*Assistant Examiner* — Amal Zenati (57) ABSTRACT

Method and apparatus for controlling a provisioning process. A first provisioning entity (115) issues a provisioning order (401). A provisioning controller (10) checks whether the received provisioning order is complete. If the order is not complete, a second provisioning entity (116,115) is selected to provide further provisioning data (PD1,PD2,PD3,PD4,PD5,PD6) so as to complete the incomplete received provisioning order and to send the corresponding provisioning order/s to the corresponding provisioned entity/ies (121, 122, 123). The provisioning controller may check a service provisioning template (PT-X), which can comprise identifiers of provisioning entities that can supply certain provisioning data, identifiers of the data that can be obtained from each and sequence information determining the order in which said data may be collected and provided for provisioning a given service. A status register may be used to keep track the processing status of a received provisioning order.

8 Claims, 4 Drawing Sheets

METHOD AND APPARATUS FOR CONTROLLING A PROVISIONING PROCESS IN A TELECOMMUNICATIONS SYSTEM

FIELD OF THE INVENTION

The present invention relates to the provisioning of telecommunication services in telecommunications systems and, more precisely, to a method and an apparatus for controlling provisioning processes in distributed provisioning scenarios.

BACKGROUND

The term "provisioning" is commonly used in the field of telecommunications to refer to the processes by which telecommunication services are managed (e.g. created, subscribed, modified, deleted, etc), which implies to "provide" the necessary data in the appropriate entities (e.g. application servers, telecommunication nodes, user terminals, etc) that are involved in the delivery or in the consumption of said services. Across the present application, the term "telecommunications service" (or its truncated well-known form "service") is used to refer to the services that can be provided by a telecommunications system, which can comprise: basic communication services (such as voice, data or multimedia calls), enhanced services (such as intelligent treatment of calls), messaging services (such as short messages SMS, or multi-media messages MMS), information services (such as location-based weather information), etc, or combinations thereof.

Provisioning a telecommunication service involves a "provisioning process", which can be described as the set of actions required to manage the necessary data to allow said service to be created, modified, subscribed, etc. For example, provisioning processes may take place for the subscription of a user to a given service provided by a telecommunications system, for the withdrawal or modification of said subscription, or for the creation of a new service supplied from said system. A provisioning process may also take place for the creation of a new subscription for a new user in a telecommunications system, as it usually implies the subscription of the user to, at least, a set of basic services.

A provisioning process involves a provisioning entity issuing the appropriate provisioning orders to a number of provisioned entities. Traditional provisioning entities are management or administration servers assigned to service setting or service configuration tasks, such as Customer Administration Systems (CAS); while the kind of provisioned entities may range from serving entities in telecommunications systems (e.g. a telecommunications node such as a home location register HLR, an application server such as a messaging service centre SMSC MMC, a presence server, etc), to user terminals adapted to access to a telecommunications system (e.g. mobile phones, personal computers, etc).

Known provisioning techniques regards various forms by which, in a provisioning process, a provisioning entity can communicate with one or more provisioned entities so as to manage the corresponding data. For example, the provision of a given service may involve setting, modifying or erasing data in more than one provisioned entities, which can involve the use of a plurality of communication interfaces as well as the use of various communication protocols, so as to properly convey the appropriate provisioning orders. Thus, a first problem dealing with provisioning was to control and simplify the provisioning process taking into account the particularities of the different kind of provisioned entities.

This problem is addressed by patent application WO 00/38437, which discloses a "handler interface" (ref. 22 on its FIG. 2) arranged to: (i) receive a provisioning order issued from a provisioning entity (a Customer Administration System CAS), (ii) identify provisioned entity/ies ("network elements") affected by said order, (iii) determine whether the received provisioning order is "incoherent" (not understandable, not applicable or conflicting), and (iv) send one or more specific provisioning orders derived from the received order to the affected provisioned entity/ies; wherein a sent specific provisioning order is adapted by the "handler interface" to be understandable for a target provisioned entity. To accomplish with these tasks, the "handler interface" of WO 00/38437 comprises a database (ref.32 on its FIG. 2) that stores ("network over-view knowledge") the relation between subscribers, their subscribed services and the network nodes which supply said services. Accordingly, said patent application provides a solution to control a provisioning process, by which, a centralized provisioning entity does not need to know about details concerning the corresponding provisioned entity(ies) (such as their identities or the suitable communication protocols), and wherein "incoherent" provisioning orders are automatically detected and rejected.

In the provisioning scenario addressed by WO 00/38437, a network operator makes service provisioning from a centralized CAS to some of the telecommunication nodes of its network domain. However, the evolution and complexity of the services offered by modern telecommunications systems (some of them involving the intervention of various network and/or service operators), as well as the evolution of the user terminals, may give rise to new provisioning scenarios that, eventually, could go beyond the simplified (centralized) scenario addressed by WO 00/38437. In particular, new kind of actors, beyond the network operator's management or administrative systems, might advantageously be involved as provisioning entities in provisioning; which, in turn, might add complexity to the provisioning processes in said—let's say—distributed provisioning scenarios.

For example, a user terminal may be involved as a provisioned entity in a provisioning process that, e.g., affects some of its configuration data. Advantageously, a user terminal (e.g. via a self-provisioning application) could be also involved as a provisioning entity in a provisioning process that, e.g., affects the subscription data of its user. Furthermore, a company can hold a "master" subscription (e.g. a corporate subscription) in a given network operator (such as a mobile network operator) for some of its employees, wherein they are provided with individual subscriptions belonging to the "mater" subscription with said operator. In this situation, it should also be desirable that said company might also be involved in provisioning and, e.g., might issue provisioning orders for subscribe, withdraw or modify some service(s) for some of its employees; thus, avoiding to send (e.g. by mail) administrative petitions to the network operator and the subsequent administrative processing, and thus avoiding delays until the corresponding provisioning order(s) are finally entered in the network operator's CAS system. Also, a network operator may sign service agreements with some service providers (e.g. content providers, added-value service providers, etc) that can provide services from their own application servers through the premises of the telecommunications system of the operator. In this latest case, it might be desirable that configuration or administrative systems belonging to a service provider might also issue provisioning orders affecting entities under the domain of the network operator (such as telecommunications nodes, servers, etc, of the network operator, as well as to user terminals subscribed to said network operator), so as configure or adapt them for a given service. Similarly, it might be also desirable that a management or administrative system belonging to the network operator issues provisioning orders affecting servers belonging to a service provider. Furthermore, in some cases, it may be desirable to use various management systems to manage the same network element, user terminal, server, etc, (e.g. each specialized in providing different portions of service configuration data).

A prior-art solution as described in the aforementioned patent application WO 00/38437 helps to insolate a provisioning entity about details concerning the provisioned entities, as well as to prevent incoherent provisioning orders to progress. However, it addresses a centralized provisioning scenario with a single entity issuing all the provisioning orders concerning the provision of a service and, therefore, it is assumed said single provisioning entity provides all the data needed to execute a provisioning process for a given service (i.e. all the provisioning data for a service to be properly created, modified, subscribed, etc). For distributed provisioning scenarios as cited above, a solution to control a provisioning process as described therein would provide the aforementioned advantages of insolating a provisioning entity about details concerning a provisioned entity, as well as detecting and rejecting incoherent provisioning orders. However, it would also compel any eventual provisioning entity to know all the necessary data related to the provision of a given service; given that, otherwise, an incomplete provisioning order issued would be considered "incoherent", and thus rejected, since it would be inapplicable as such.

Therefore, it is an object of the present invention to provide an alternative solution to control a provisioning process in a distributed provisioning scenario.

SUMMARY OF THE INVENTION

The aforementioned object is achieved by a method as claimed in claim 1. This object is also achieved by a provisioning controller apparatus as claimed in claim 7, or by a computer program as claimed in claim 13. Embodiments of the invention are set out in the dependent claims.

The solution according to the invention is characterized in that an initial provisioning order starts a provisioning process, which comprises: (i) identifying the provisioning entities which shall take part to complete a given provisioning process for a given service, (ii) collecting the needed provisioning data from these provisioning entities, and (iii) sending the final provisioning order/s to the corresponding provisioned entity/ies comprising the necessary provisioning data. Thereby, allowing a provisioning order to start the execution of a complete provisioning for a service, even when it does not comprise all the necessary provisioning data for a service to be properly created, modified, subscribed, etc.

According to an embodiment of the invention, a service provisioning template is checked for the provisioning process of a service. For a given provisioning order for a given service, it can state what provisioning data to collect, from what provisioning entities, and in what sequence shall these data be collected and/or provisioned. According to a further embodiment, for the provisioning process started by a received provisioning order, a provisioning status register is kept updated according to the relevant events of said process, which helps to control its complete execution, as well as to provide information about said status to a provisioning or provisioned entity involved in said provisioning process.

A method or provisioning controller apparatus according to the invention allows a reliable centralized provisioning through delegated/distributed provisioning operations, as it implements a mediation process which, at reception of an initial provisioning order is able to: require from the corresponding entities to provide the necessary provisioning data in the suitable sequence, send to the provisioned entity/ies the subsequent provisioning order/s in the suitable sequence so as to complete the provisioning process started by an initial provisioning order, and store the processing status of a provisioning process started by an initial provisioning order according to the related operations performed. Accordingly, the method or provisioning controller of the invention allows to start a complete provisioning process even when the data to be provisioned are not all known when the initial provisioning order is sent, or not known to the provisioning entity that sends said initial provisioning order.

A provisioning solution as disclosed herein is a generic solution which can fit in complex service provisioning scenario, which may involve traditional telecom services, internet related services, and combinations thereof. Thereby, allowing more than one provisioning entity to take part in the provisioning process of a given service, without needing to know in a given provisioning entity all the data to be provisioned and/or details about the provisioned entities destination of these data; wherein a particular provisioning entity can contribute with a part of the data to be provisioned, which may be a data it knows, or a data it is entitled to supply.

Features of the present invention can advantageously be incorporated in a prior-art provisioning controller interface as the one cited earlier. Thereby, providing a solution that allows to complete coherently a provisioning process started from a provisioning entity that, by virtue of the features of the invention, does not need to know all the necessary data, or does not or should not have access to them, by: automatically initiating a request for provisioning data towards a provisioning entity, when some data necessary data to be provisioned is missing in an initial provisioning order; and coordinating the different entities which can be involved in a provisioning process, i.e. entities which can provide the necessary information and/or which can be provided with some information.

BRIEF DESCRIPTION OF THE DRAWINGS

The features, objects and advantages of the invention will become apparent by reading this description in conjunction with the accompanying drawings, in which.

DETAILED DESCRIPTION

Some exemplary embodiments of the invention shall now be described in detail with references to FIGS. 1 to 4A/4B.

Figure 1:
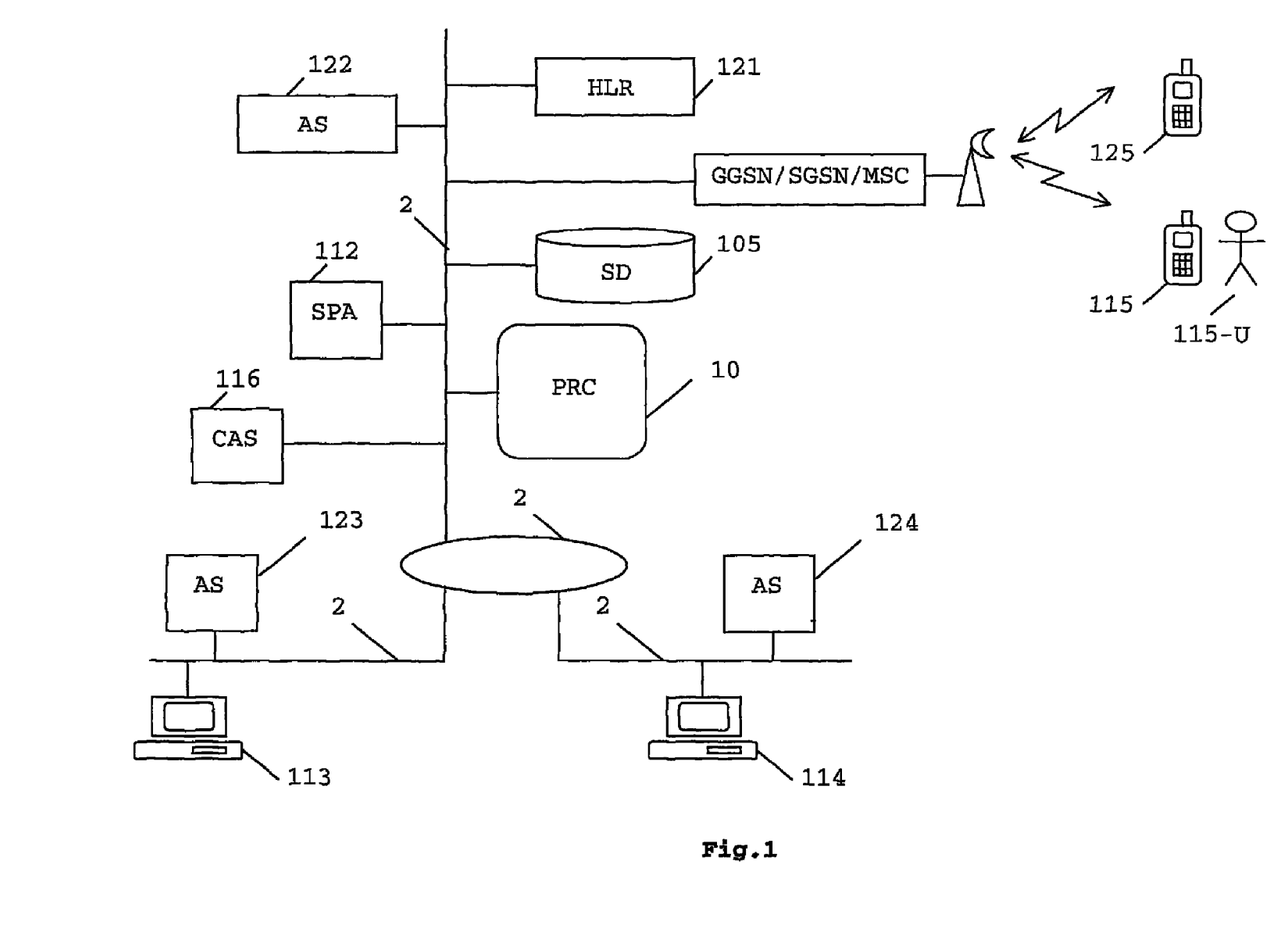
FIG. 1 shows schematically a telecommunications system comprising a plurality of provisioning and provisioned entities and an apparatus for controlling a provisioning process.

The system illustrated in FIG. 1 represents a simplified physical view of a complex telecommunication system comprising: a mobile communications system (such as a GSM or UMTS system) of a mobile network operator, and service network systems of one or more service operators. In this scenario, it can be assumed that the mobile communications system provides basic communication services (e.g. voice, data or multimedia communications), as well as some additional services; while other additional services (e.g. weather information, location-based information) are provided by (or in cooperation with) one or more application servers ASs (123, 124) of the service operators. It shall be noticed here that a given network operator owning, e.g., a mobile communication system may also have application servers (e.g. AS 122) to provide some extra services to its subscribers (or to subscribers of another operators) that go beyond the basic communication services, thus, becoming also a service operator. A logical (functional) view of the system shown in FIG. 1 could be represented by a layered structure comprising: an access-layer comprising radio base stations or other access points to the telecommunication system, a core-network-layer comprising telecommunications nodes (MSC, SGSN, GGSN, HLR) for providing basic communications services, and a service-layer comprising the plurality of application servers (122, 123, 124) of the mobile network operator and service providers.

The scenario referred above has been selected to primarily exemplify a complex telecommunications system, in which, given the plurality and different kind of eventual provisioned and provisioning entities, the principles of the invention can apply more advantageously. However, the skilled person will understand from the following description that the scope of the present invention is not limited to any particular kind of telecommunications system.

FIG. 1 shows, by way of example, some functional entities which are common to a state-of-the-art mobile communications system, such as a Mobile Switching Centre (MSC), a Serving GPRS Support Node (SGSN), a Gateway GPRS Support Node (GGSN), or a Home Location Register (or Home Subscriber Server) (HLR, 121). These functional entities (also known as telecommunication nodes) are entitled to provide basic communication services between user terminals (115, 125), as well as to facilitate communications between user terminals and application servers AS (122, 123, 124). The radio access network of a mobile telecommunications system has been also schematically represented in FIG. 1; however, other kind of wired or wireless access networks might be used to facilitate the access of user terminals (115, 125). For example, in case of a UMTS mobile system, user terminals (115, 125) may access to the core-network layer and to the service-layer through other kind of accesses (not shown in FIG. 1), such as wireless Local Area Networks WLAN. Depending on their specific functionality, application servers AS may also intervene in the signaling related to basic communication services so as to provide enhanced features or to control high-level aspects of a communication (such as intelligent treatment and/or routing of incoming calls, multi-conference handling, etc). To illustrate the foregoing examples, it can be assumed that AS 122 belongs also to the mobile network operator, while ASs 123 and 124 belong, respectively, to two different service providers which have service agreement with the mobile network operator so as to provide special services to some (or all) subscribers of the mobile network operator.

To accomplish with their respective functionality, some of the entities shown in FIG. 1 may communicate through one or more communications networks (2), which, although also represented schematically, may be assumed to represent a plurality of interconnected networks (including intranets, the Internet, dedicated signaling lines, etc), as well as the necessary gateways (not shown) for accomplishing with the necessary protocol translation and/or routing functions.

In this scenario, various servers may act as provisioning entities. For example, the mobile network operator may have a Customer Administration System CAS (116) for issuing provisioning orders concerning subscription data of a user (115-U) stored in a HLR (121), and/or concerning service configuration data, or user specific service data, stored in a service database (SD, 105) and/or in an AS (122, 123, 124). In particular, the service database 105 may represent a data repository assigned to be a master storage place for service configuration and/or service subscription data. Similarly, a service provider may have a server (113, 114) assigned to issue provisioning orders which may affect service configuration data held by their application servers (123, 124) and/or service subscription (or service configuration) data related to one or more specific users held on the mobile operator's HLR (121) and/or service database (105). Also, a server (SPA, 112) may provide self-provisioning application that may help a user (115-U) to issue from a terminal (115) provisioning orders to, e.g., modify a data related to his subscription or data related to a subscribed service (such as the preferred language, time of the day for receiving a given information service, etc.), which are held by the HLR (121), by a service database (105) or by an AS (122, 123, 124). Therefore, a user terminal, with or without the help/mediation of a SPA, may be also a provisioning entity. A further example of provisioning entity types can be an administration server (or an authorized user terminal) of a company having a corporate (master) subscription with a given network operator for some of its employees. In this case, provisioning orders might be issued (e.g. with or without the mediation of a self-provisioning application 112) from said administration server (or from said authorized terminal) that would affect to individual subscriptions belonging to the master one (e.g. to globally or individually subscribed services).

To insolate the provisioning entities about details concerning provisioned entities, and for controlling the necessary provisioning processes, a provisioning controller (PRC, 10) is also connected to the communications network (2). According to prior-art solutions dealing with provisioning mediation techniques, the PRC (10) is arranged for receiving a provisioning order from a provisioning entity (113, 114, 115, 116), and, responsive to it, sending one or more provisioning orders derived from the received order to one or more provisioned entities (121, 122, 123, 124, 125). The PRC (10) of the invention is further arranged to coordinate a provisioning process so as to allow completing it when a provisioning order, which does not contain all the necessary provisioning data, is issued by a provisioning entity.

The internal simplified structure of provisioning controller PRC (10) shown in FIG. 1 shall now be described with reference to FIG. 3, that considers a possible implementation as a computer-based apparatus, which, as in most of the modern telecommunications systems, is a preferred implementation basis for telecommunication nodes and servers.

It is well known that an apparatus which serves or mediates in the services provided by or through a telecommunications system (such as a telecommunications node, AS, gateways, etc.) is, regardless its specific construction details, comprised of one or more functional modules, each arranged to perform a specific sub-function of the total functionality implemented by said apparatus, and, eventually, arranged to cooperate with other functional module(s) in said apparatus. Furthermore, a the functionality of a given telecommunications node, server, etc, (which in fact may be considered as a "functional entity") may be distributed across various apparatuses, each performing a part of the total functionality said node, server, etc, is assigned to perform. Also, in some implementations, the same apparatus may implement the functionality of two different nodes or servers (e.g. a computer-based apparatus may implement the functionality of two functional entities such as a SGSN and a GGSN, or the functionality of two ASs providing two different services). Computer-based apparatuses comprise software and hardware; wherein a specific functional module in a computer-based apparatus may comprise software, hardware, or a combination of both; said functional modules being designed to perform a specific (sub)function and, if proceeds, to cooperate with software and/or hardware parts which implements other functional module(s). Once the functionality of a functional entity for a telecommunications system has been defined, the construction of the functional modules to build up a realization of the corresponding apparatus(es) is a matter of routine work for those skilled in the art. Accordingly, the explanation given with reference to FIG. 3 shall describe some basic functional components of a provisioning controller PRC (10) without falling into specific construction details concerning its possible construction realizations, which are well known by those skilled and, consequently, which are not needed to understand the invention.

Figure 3:
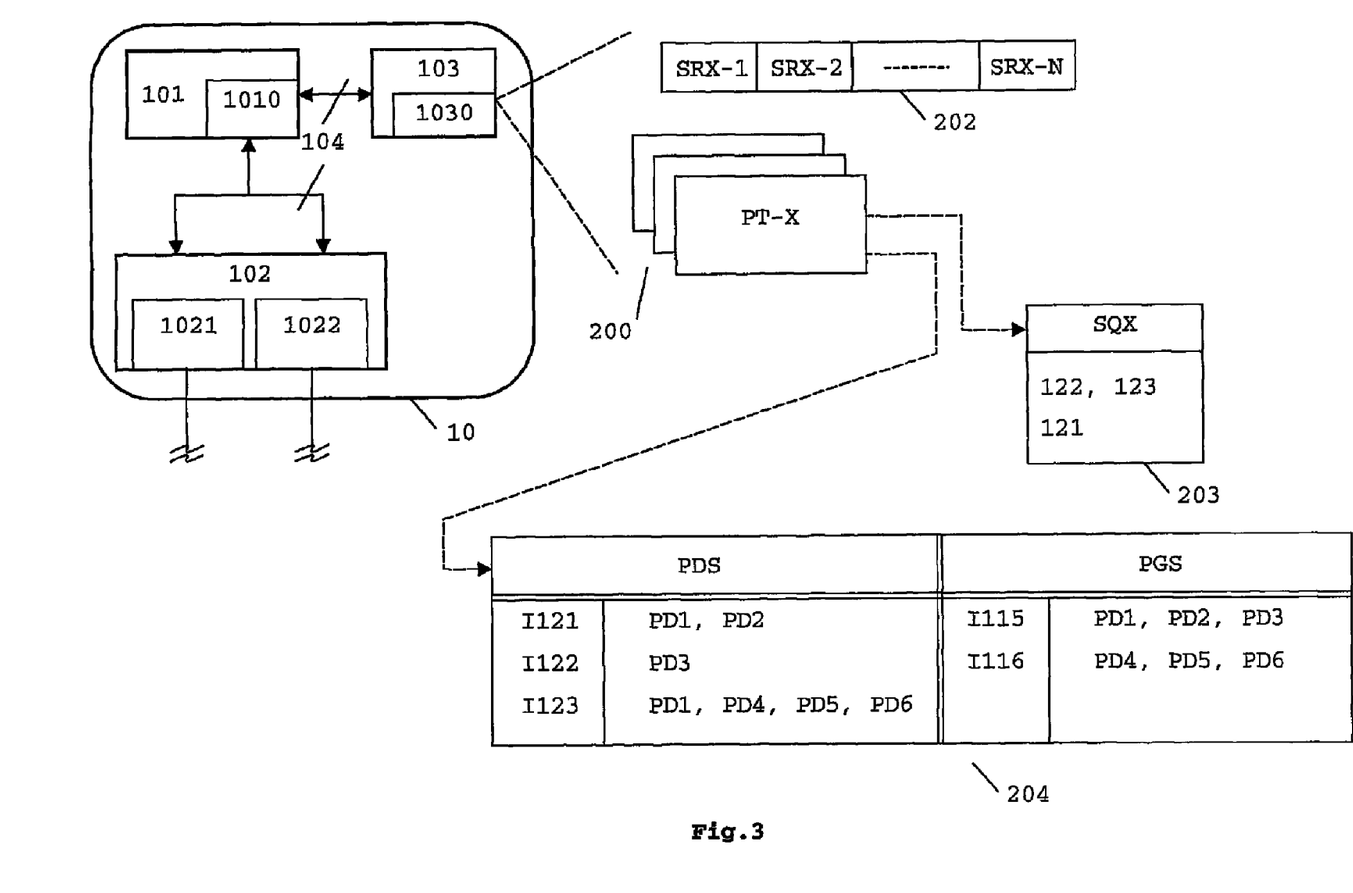
FIG. 3 shows a schematic representation of some functional modules of an apparatus for controlling a provisioning process according to the invention, as well as some of the data handled in said apparatus for controlling said process.

The simplified internal structure shown in FIG. 3 comprises: a processing module (101), a communications module (102), a data storage module (103) and one or more internal communication buses (104) which allow data communication and cooperation between them. The processing module (101) can comprise one or more processors (1010), for example, working in load-sharing or active-backup mode. It executes service logic to process the signaling exchanged between the PRC (10) and other provisioning or provisioned entities (113, 114, 115, 116, 121, 122, 123, 124, 125), as well as to control/access the other functional modules (102, 103) in the PRC (10), so as to provide a provisioning control as known from the prior art, also enhanced with the novel functionality of the invention.

External communications are performed through the communications module (102) that can comprise one or more communication devices (1021, 1022). Depending on implementation alternatives, some communication devices may be devoted to a specific kind of communication (e.g. only with some kind of provisioning or provisioned entities, only for a given type of communication protocol, only for some kind of provisioning orders or data requests, etc), whilst some of them could be suited for any kind of communication needed. SOAP (Simple Object Access Protocol) or LDAP (Lightweight Directory Access Protocol) are examples of communication protocols commonly used in provisioning that, among others protocols well-known by those skilled in provisioning techniques, may be used in communications between the PRC (10) and provisioning or provisioned entities. In any case, the number of communication devices (1021, 1022) in the communications module (102) could vary according to, e.g., its individual capacity for handling external signaling compared with the overall external signaling estimated for the provisioning controller PRC (10). Depending also on implementation details, the communications module may comprise some functional elements (hardware, software or combination) that may be common to one or more communication devices, such as a part of a given communications protocol stack, being the other (protocol specific) parts residing on the corresponding communication device.

The PRC (10) may also have a data storage module (103) to store data needed for its operation. The data storage module (103) may comprise one or more data storage devices (1030), such as, memory chips, magnetic or optical discs, etc, and combinations thereof. The data storage module (103) of the PRC may incorporate one or more storage devices of the same or different kind according to different implementation criteria, such as data access speed required or the reliability desired for certain stored data. In one possible embodiment, the data storage module (103) may be devoted to store some basic data such as, for example, computer readable program code that may be needed to control the operation of the PRC (10), temporary data storage of dynamic information, etc; whilst further data (202, 203, 204) that may be needed to control its operation according to the invention (that will be later described) may be stored in another entity (such as in the service database 105, or in other database or server) and accessed there by the PRC (10) (e.g. via LDAP). Alternatively, the data storage module (103) in the PRC (10) may comprise some or all of said further data, as it is illustrated in FIG. 3.

A method for controlling a provisioning process for a given telecommunication service shall now be described with reference to the flowchart of FIG. 2. References shall also be made to the simplified data structures represented in FIG. 3.

The method, as described hereinafter, may be assumed to be carried out by the PRC (10), which may act as a centralized provisioning entity entitled to mediate in provisioning orders between provisioning entities and provisioned entities, wherein provisioning orders are first received by the PRC (10), and wherein all the subsequent provisioning orders derived from them are sent from the PRC (10) to the corresponding provisioned entities (121, 122, 123, 124, 125). However, other alternative implementations shall be later briefly discussed, which follow in essence the basic steps of the method illustrated in FIG. 2, although performed in cooperation with other entities.

In step 300 a provisioning order (X) is received from a provisioning entity. According one advantageous embodiment, a register (202) may store the processing state of the particular provisioning process started by a received provisioning order according to the events related to said particular provisioning process. For example, as illustrated in FIG. 3, for a given provisioning order (e.g. type "X"), there can be a plurality of status registers (SRX-1, SRX-2, ... SRX-N) each storing the corresponding individual processing status of an ongoing individual instance of said provisioning order. Thus for a particular instance "N" of a particular provisioning order (X), a status register (SRX-N) should be updated according to the relevant processing events started by said particular provisioning order (that shall be hereinafter described). Thus, a subsequent step after step 300 (not shown in FIG. 2) might be to set a predefined "initial" processing state in a status register (SRX-N) instantiated (i.e. created or assigned) for the received provisioning order. If provisioning data are received in the initial provisioning order (X) they may be adapted to the necessary format (i.e. understandable for the target provisioned entity/es) at this stage, or when a final provisioning order is to be sent to a provisioned entity (steps 305 or 306).

Next, in step 301, it is verified whether all the necessary provisioning data in relationship with the received provisioning order have been received. In this processing state, step 301 may comprise to check whether the received provisioning order (X) is a complete provisioning order; namely, to check whether it comprises all the provisioning data in relationship with the provisioning process inherent to said provisioning order (X). A given provisioning order may be determined to be incomplete depending on various basic criteria, such as, e.g., the type of order, the sender of the order, the type of sender, etc. As an example, a provisioning order (X) may be issued by a user terminal requesting to activate a new subscription to a mobile network operator, or requesting to subscribe to a new service. In said case, it can be primarily determined (e.g. from the type of order itself and/or from the type of originator) that the received provisioning order is not complete, since some further data might be needed which are not assumed to be provided (or known) by the user handling the terminal. The completeness of a received provisioning order (X), as well as some additional information useful to control the corresponding provisioning process according to the invention, may be determined by checking a set of related data stored in relationship with a given provisioning order. The set of said data for a given provisioning order (X) are referred in the present application as the "service provisioning template" (PT-X) corresponding for said order.

Some possible contents of a service provisioning template (PT-X) shall now be described with reference to the simplified data structure representation shown in FIG. 3, which gives only an example intended for illustration purposes, but which does not compel the use of a particular data storage arrangement nor any particular data format for the stored data.

As illustrated in the embodiment shown in FIG. 3, the data storage module (103) in the PRC (10) may comprise a plurality (200) of provisioning templates, each corresponding to a provisioning order. Also, as discussed earlier, the provisioning templates may be held by another server and its content be accessed from there by the PRC (10). Provisioning template PT-X may be assumed to be the corresponding service provisioning template for provisioning order "X". As illustrated, it may comprise information about the provisioned entities (PDS) for said provisioning order, information about the corresponding provisioning entities (PGS), as well as information about the corresponding provisioning data that shall be respectively collected from said provisioning entities and provided to said provisioned entities. The information about provisioning and provisioned entities may comprise their corresponding identifiers (I121, I122, I123, I115, I116) (e.g.: IP addresses, URLs, etc), which may be usable to establish and route communications (e.g. provisioning orders, requests for data) to said entities, or to obtain the corresponding routable information by other means (such as Domain Name Service DNS, LDAP, etc). Depending on the nature of the provisioning or provisioned entity, an identifier of a provisioned or provisioning entity (I121, I122, I123, I115, I116) may even be generic, wherein the pertinent individual value may be set during the execution of the corresponding provisioning process. For example, a given identifier (I121, I122, I123, I115, I116) may, in a predetermined generic format, identify "user terminal", or "AS", or "Partner SP Administration Server" (e.g. a server acting as described earlier for servers 113, 114); wherein the particular identifier to be used subsequently is assigned in execution time (e.g. from identification data received in a provisioning order, or as a data collected later during its subsequent processing).

In the particular example case shown in FIG. 3, it has been assumed that, for the provisioning order "X", its corresponding provisioning template (PT-X) states that the provisioning entities are a user terminal (115) and a CAS (116). From these provisioning entities it shall be collected (or received in the initial provisioning order), respectively: provisioning data "PD1", "PD2", "PD3", and provisioning data "PD4", "PD5", "PD6". These can be generic identifiers for certain (simple or complex) data, which need not to be the—let's say—"standard" identifier (if any) used to identify them in provisioning orders, but an internal representation usable by the PRC (10). The provisioning template (PT-X) states that the provisioning order "X" affects, as provisioned entities, to the HLR (121) and to two application servers (122, 123), and states the provisioning data they shall receive. In the case illustrated by FIG. 3: "PD1" and "PD2" shall be sent to provisioned entity HLR (121); "PD2" to AS 122; and "PD1", "PD4", "PD5", "PD6", to AS 123.

The sequence for sending provisioning orders to provisioned entities may be irrelevant if, for example, for a given provisioning order, only one provisioning entity and only one provisioned entity are expected to be involved. However, either or both: the order for sending provisioning order(s), as well as the order for collecting the necessary data, may be important factors in some cases. For example: when (temporary or permanent) data inconsistency should be avoided between the concerned provisioned entities, when some provisioning orders must not (or can not) be sent until some provisioning data have been made available or have been provided in the corresponding provisioned entity, etc.

To address this aspect, a provisioning template (PT-X) may further include sequencing information (203, SQX), so as to easily determine for a provisioning order (X) the sequence of subsequent provisioning orders to be sent and/or the sequence in which the corresponding provisioning data shall be obtained. In the example illustrated, the sequencing information (SQX) of the provisioning template of order (X), states that application servers 122 and 123 shall be provisioned before that HLR 121. In this case, the sequencing information (SQX) does not contain sequencing information concerning the sequence for obtaining the necessary provisioning data. However, said information may also implicitly be stated by the explicitly contained sequencing information (SQX) for sending the final provisioning orders, taking also into account the concerned provisioning data to be sent. In the example, since a provisioning order containing "PD6" is to be sent to AS 123 before than "PD1" and "PD2" are sent to HLR 121, it is implied that "PD6" shall be collected from CAS 116 before sending the corresponding provisioning order to HLR 121. Nevertheless, whenever needed, the sequencing information (SQX) may store a sequence that, for a received provisioning order (X) comprises explicitly the sequence for obtaining provisioning data and the sequence for sending the subsequent provisioning order(s). Thereby, allowing to specify what provisioning data can be requested and/or provisioned in parallel, and what provisioning data shall be requested and/or provisioned before another one.

Figure 2:
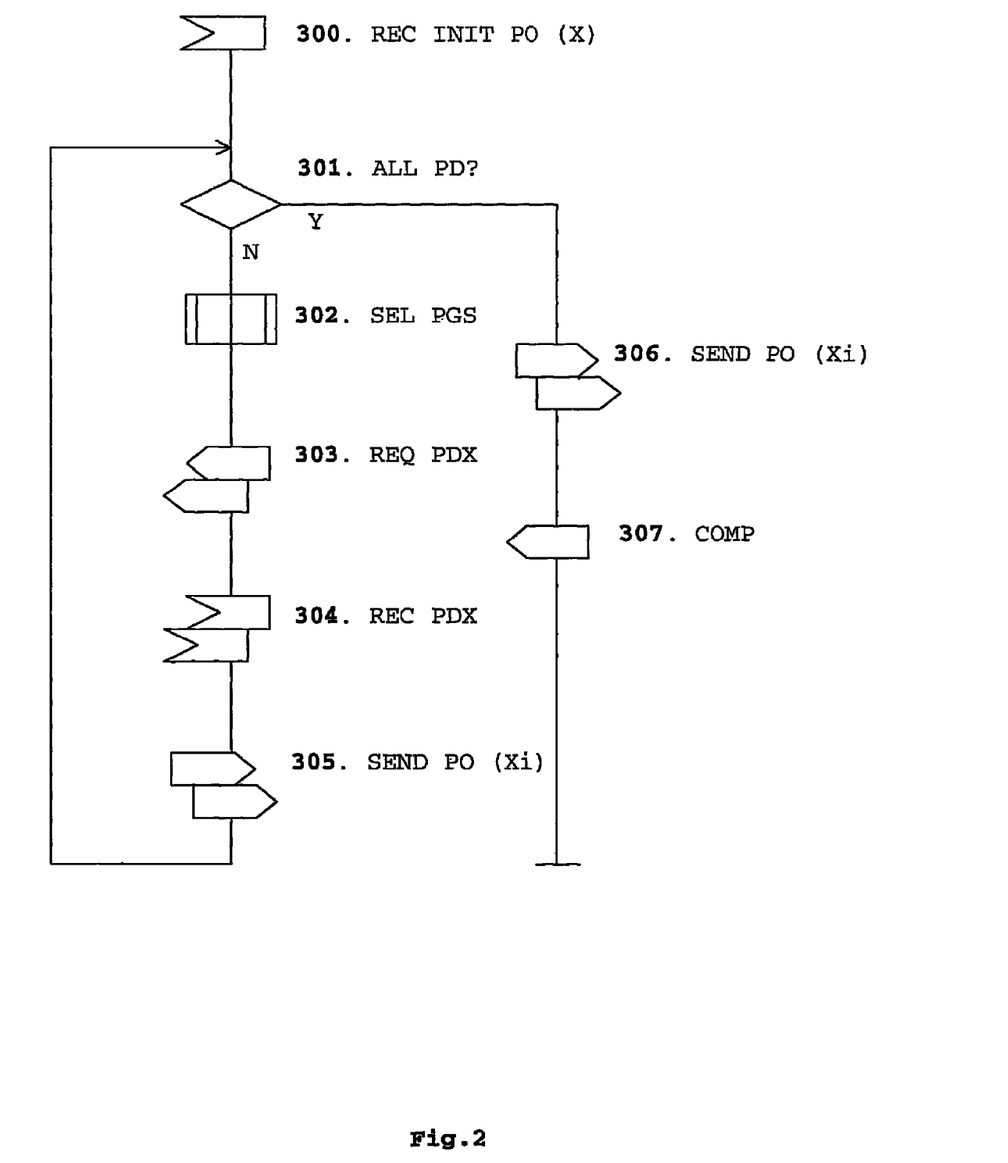
FIG. 2 shows a flowchart illustrating some steps of a method for controlling a provisioning process for a telecommunication service according to the invention.

Going back to the flowchart of FIG. 2, in step 302, a provisioning entity is selected to obtain the necessary provisioning data which was/were missing in the received provisioning order (X). This step, as well as subsequent steps (including further iterations in the represented loop) may be advantageously monitored and controlled by the content of the provisioning template (PT-X) and the status register (SRX-N). Otherwise, if the received provisioning order is complete, the necessary provisioning order/s (Xi) derived from the received one (X) are sent in step 306 to the corresponding provisioned entities (121, 122, 123, 124, 125). This may comprise in some cases the sending of the original order as received. Optionally, an indication on that the corresponding provisioning process has been completed can be sent in step 307 to the provisioning entity that sent the initial provisioning order (X).

If the received provisioning order (X) is not complete, in step 303 one or more requests for obtaining provisioning data are sent to the selected provisioning entity/ies (113, 114, 115, 116). The request(s) sent in this step may comprise information to identify the necessary provisioning data. This can be useful wherever the receiving (provisioning) entity is not assumed to know, or to automatically determine, what data it is required to provide at reception of said request. For example, if the receiver of the request is a user terminal (115) (or any other terminal which can be assumed to be operated by a human user, e.g. 113 or 114), the request may comprise information so as to build up in said terminal some kind of human-readable form where its user (115-U) may introduce the required data. For example, if the receiver of the request is a system that is assumed to have access to a plurality of data, some of them not of interest for the provisioning process of a particular provisioning order (e.g. a CAS 116, or an administration server of a SP-113, 114), the information contained in the request (e.g. in a eXtensible Markup Language XML document) may help said system to determine the concerned data and to give them back in the subsequent response. Also, the information to identify provisioning data in a request (step 303) may also comprise information about the received provisioning order, which may allow the receiving provisioning entity to determine what provisioning data are then expected in the subsequent response to said request.

Accordingly, the information to identify provisioning data which may be sent in a request (step 303) may comprise identifiers of the requested data and/or information usable to determine them by the receiving party (113, 114, 115, 116). A possible data format that may advantageously be used to build some or all data (203, 204) corresponding to provisioning templates is XML; thus allowing to request provisioning data to provisioning entities (step 303) and receive (step 304) said provisioning data by exchanging XML documents conveyed in said requests and the corresponding responses.

In step 304 the response/s to the request/s sent in step 303 is/are received. The obtained provisioning data received in step 304 may be adapted to the necessary format, so as to make them understandable for the target provisioned entity, either: when a response is received (step 304), or when a final provisioning order is to be sent to a provisioned entity (steps 305 or 306). As cited above, the sequence for sending said requests, as well as for sending the necessary subsequent provisioning order/s, may be determined by the sequencing information (SQX) of the corresponding provisioning template (PT-X). Therefore, step 305 may represent an optional sending of one or more provisioning orders (Xi) in cases wherein all the provisioning data for said order/s have been obtained, and the sequence information (SQX) allows said order/s to be sent in that moment. Accordingly, the execution loop (301 to 304 and, optionally, 305) may, in some cases, be executed several times, and may end up (e.g. when no responses are pending and all the necessary provisioning orders have already been sent) by a direct branch (not represented in FIG. 2) to step 307, from where, optionally, a confirmation about the execution of the corresponding provisioning process may be sent to the provisioning entity that sent the initial provisioning order (X). Alternatively, as represented in the figure, the final provisioning order/s (Xi) may be sent in step 306 when all the provisioning data have been obtained.

The information to identify provisioning data sent in a request in step 303, may also comprise a provisioning data (or auxiliary information usable to obtain a given provisioning data) received earlier in a response from a provisioned entity in an early step 304, or received in step 300 within the initial provisioning order.

The method of the invention, as described above, may be carried out by a PRC (10) as described herein alone. However, other embodiments are also possible in which some of the described steps may be carried out by other entities, or in cooperation with them, which can make unnecessary to keep information about the provisioned entities, e.g., in cases wherein this kind of information is already known or may be accessible by the cooperating entity.

For example, the PRC (10) may act in cooperation with a centralized provisioning entity (e.g. such as the provisioning controller interface of WO 00/38437) already existing in the telecommunications system that, for example, may be arranged to receive an issued provisioning order and distribute the final provisioning order(s), and that, eventually, might be also arranged to perform other additional task, such as authenticate the provisioning entities and/or authorize them when issuing provisioning orders. Said cooperation would comprise, for example, that initial provisioning orders are received by said centralized provisioning entity, which would then notify them to the PRC (10). Then, the PRC (10) may communicate with said centralized provisioning entity so as to prompt it to issue the necessary request/s for further provisioning data to the appropriate provisioning entities and, when applicable, would prompt it to send the subsequent provisioning orders towards the appropriate provisioned entities.

A further implementation alternative for the method of the invention would be possible in which the PRC (10) could perform a similar procedure as the one summarized above, but directly with the provisioning entities. In said further implementation, the PRC (10) would receive an initial provisioning order from a provisioning entity and would analyse its content. Subsequently, the PRC (10) would indicate (e.g. using one or more signaling flows) said provisioning entity: what provisioning data should be collected, from what provisioning entities, information about the corresponding target provisioned entity/es, as well as sequencing information when needed.

Alternatively, the PRC (10) could obtain the necessary further provisioning data from the appropriate provisioning entities and would forward them, together (if needed) with the necessary information about the target provisioned entity/ies, to the provisioning entity that sent the initial provisioning order.

For the sake of simplicity, the alternative embodiments cited above have not been considered in the figures of this application, and, in order to avoid an unnecessarily extensive description, they are not explained in further detail. However, in view of the steps of the method according to the invention as described with reference to FIG. 2, and taking into consideration the summarized explanation given above, it shall be a mater of routine work for the skilled person to implement any of said alternative embodiments. In particular, the following summary outlines features which are common to any of the embodiments described in the present application: A first provisioning entity (115) issues a provisioning order (300). A provisioning controller (10) checks whether the received provisioning order is complete. If the order is not complete, a second provisioning entity (116, 115) is selected to provide further provisioning data (PD1, PD2, PD3, PD4, PD5, PD6) so as to complete the incomplete received provisioning order and to send the corresponding provisioning order/s (305, 306) to the corresponding provisioned entity/ies (121,122,123). The provisioning controller may check a service provisioning template (PT-X), which can comprise identifiers of provisioning entities that can supply certain provisioning data, identifiers of the data that can be obtained from each one of them, and sequence information determining the order in which said data may be collected and/or provided for provisioning a given service. A status register may be used to keep track the processing status of a received provisioning order.

Figure 4A:
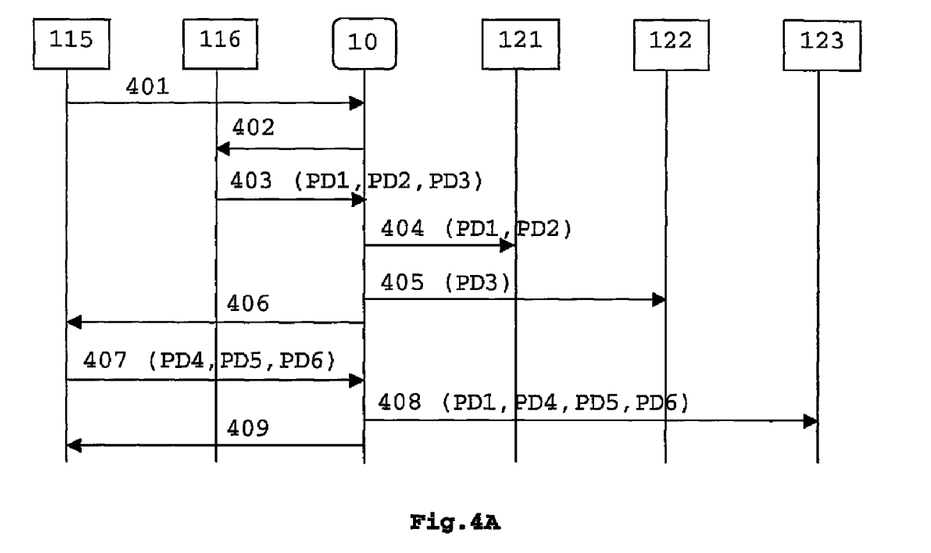
FIGS. 4A and 4B show simplified signaling flows corresponding to two different provisioning processes taking place in a scenario as the one shown in FIG. 1.

Two different provisioning process shall now be described with reference to the simplified signaling flows shown in FIGS. 4A and 4B, which consider provisioning processes taking place among some entities referred earlier for the telecommunications system illustrated in FIG. 1. According to the provisioning and provisioned entities represented in these figures, FIG. 4A may represent a first example of a provisioning process in which a user opens a subscription with a mobile network operator, and FIG. 4B may represent a second example of a provisioning process in which an administration server of a service provider starts the provision of a new service it offers.

In flow 401 a provisioning order is received in the PRC 10. For the sake of simplicity, the request is illustrated as received in the PRC 10 from a user terminal 115, however other server, such as a server providing a self-provisioning application (SPA, 112), might mediate in the illustrated flow. The received initial provisioning order may contain certain provisioning data. Also, it can contain some data usable in the subsequent provisioning process which may have been entered by the user (115-U) or that may be automatically received from the terminal 115; for example, an identifier of the terminal (such as an International Mobile Equipment Identity IMEI), an identifier of the requested subscription (such as an International Mobile Subscriber Identity IMSI), a one-time-code (e.g. a temporary password), etc.

Next, the PRC 10 checks the provisioning template that corresponds to the type of received provisioning order (e.g. "create subscription requested from user"), which, as commented earlier with reference to FIG. 2, determines the subsequent processing. In this case, a request for further provisioning data for the received provisioning order is sent to the CAS 116 in flow 402. The CAS 116 answers in flow 403 with some necessary provisioning data (PD1, PD2, PD3) for creating the subscription, which may comprise, e.g.: the Mobile Subscriber ISDN Number MSISDN, the subscriber category assigned, that may determine access to some services (such as call forwarding, voice mail, messaging services, etc), default values for said services (e.g. default call forwarding number, service centre identifiers for messaging services), etc. In subsequent flows 404 and 405, two provisioning orders are respectively sent to the HLR 121 and to an AS in the network operator 122, which may comprise some of the provisioning data obtained so far.

According to the information held by the PRC 10, some more provisioning data are needed which, for example, need to be sent to AS 123 of a service provider, wherein the provisioning entity entitled to provide them is precisely the entity issuing the initial provisioning order (401). Although not referred explicitly before, it shall be noticed here that, for a provisioning order, the information in a provisioning template (PT-X) concerning the corresponding provisioning entities (PGS) for completing the corresponding provisioning process may identify also to an eventual sender of said provisioning order.

Therefore, in flow 406 a request for further provisioning data is sent towards the terminal 115, which, as commented earlier, may comprise information to identify the necessary provisioning data. In this example case these data may concern to, e.g., user preferences for a given service, such as presentation language, time in which the service is to be provided, etc. Thus, the user (115-U) can be prompted from his terminal (115) to enter some provisioning data (PD4, PD5, PD6) which, in flow 407 are sent to the PRC 10. Subsequently, the PRC sends in flow 408 a provisioning order towards AS 123 that comprise the provisioning data (PD1, PD4, PD5, PD6) said AS will need to provide its service to the user of the recently created (activated) subscription, and notifies in flow 409 about the outcome of the provisioning process to the terminal 115.

Figure 4B:
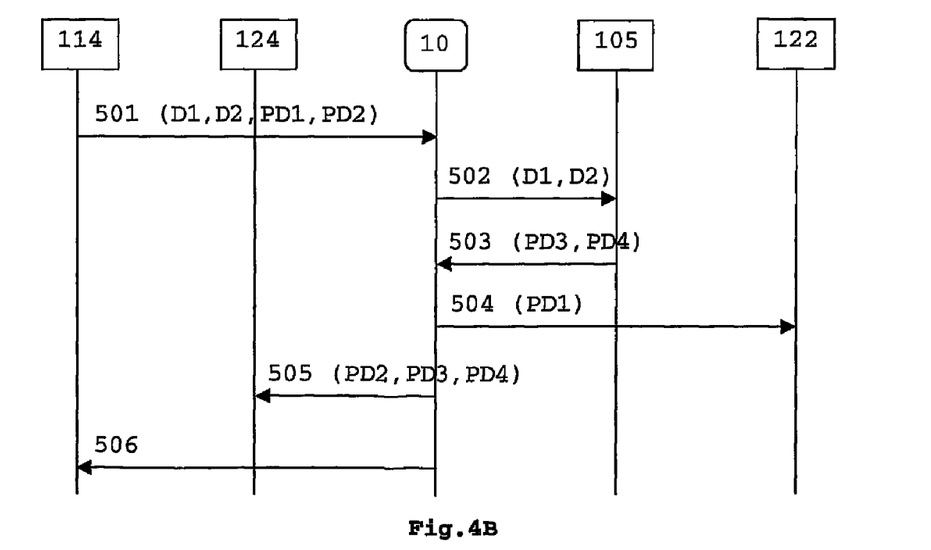

For the example illustrated in FIG. 4B it can be assumed that the necessary service logic to offer a new service (e.g. a "weather forecast" service) has already been loaded into AS 124 (e.g. in the form of computer-readable program code). Then, administration server 114 issues in flow 501 a provisioning order to start the provision of the necessary data, so as to make the new service usable by its eventual consumers. In the illustrated example, the provisioning order that initiates the subsequent provisioning process comprises some of the necessary provisioning data (PD1, PD2), and some auxiliary information (D1, D2) that, for example, may be needed to collect further provisioning data. According to this example case, the administration server 114 includes auxiliary information (D1, D2) indicating that the new service needs to access to another services, such as: a "presence" service, a "location" service or a "messaging" service (e.g. in order to provide weather information according to the current location of the users, in a suitable messaging format).

Subsequently, a request (flow 502) is sent from the PRC 10 to the service data base 105 to obtain the information that needs to be provided in the AS 123 so as to allow it to communicate with the corresponding AS(s) that hosts the required additional services, such as routable identifier(s), authentication credentials, etc. The necessary provisioning data (PD3, PD4) are then obtained from the service database 105 in flow 503. Next, two provisioning orders are sent in flows 504 and 505. The first one comprises a provisioning data (PD1) that was received in the initial provisioning order (flow 501), which may be a data that AS 122 (that for the example case may be a messaging server, a presence server, or a location server) needs in order to accept communications from AS 124 and/or to send communications to AS 124. The second provisioning order (flow 505) is sent to AS 124, and comprises provisioning data (PD2) received in the original provisioning order (501), as well as further provisioning data (PD3, PD4) obtained from the PRC 10.

As referred earlier, the use of a status register (SRX-N) for storing the processing status of a received provisioning order (X) may be used to control the processing logic in the PRC (10) according to the subsequent relevant events, such as the requests sent to provisioning entities, the responses received to said requests and subsequent provisioning orders sent. In a basic embodiment, a status register may be updated according to the requests sent to second provisioning entities and the responses received to said requests. This basic embodiment may help to, for example, set a given time for receiving a response to a given request and/or validate a response received from a second provisioning entity, as well as to control which requests or responses are pending to be sent/received or which ones have already been sent/received. Another basic embodiment would comprise to update the status register according to the provisioning orders sent, which, in a provisioning process started by a provisioning order, would help to monitor which provisioning orders have been sent and which ones are still pending. In a more complex embodiment, the overall processing status of the provisioning process started by a received provisioning order would be kept in the corresponding status register (SRX-N), which could comprise sub-status records updated according to: the provisioning data requests sent, the corresponding responses received, the subsequent provisioning orders sent, and the responses to said provisioning orders (not shown in the flows of FIG. 4A or 4B) that might eventually be received from the provisioned entities.

Depending on various factors, some provisioning processes may take a certain time to be completed (e.g. temporary unavailability of a provisioned or provisioning entity, long response times for requested data, etc). In particular, the provisioning entity that sent the initial provisioning order (X) might need information about the current processing state of the corresponding provisioning process. Therefore, according to a further advantageous embodiment (not illustrated in FIGS. 2, 4A and 4B), a provisioning entity that issues a provisioning order, as well as other provisioning or provisioned entity involved in the subsequent provisioning process, may be notified from the PRC (10) according to the relevant events concerning the provisioning process started by said order, or may request information about the current status (or performed provisioning operations). In particular, for cases in which information about the current status is likely to be requested to the PRC (10), the status information kept in the status register instantiated for a received provisioning order may advantageously be used for providing the subsequent response.

As cited earlier, functional serving entities in telecommunications systems (such as telecommunication nodes, application servers, etc) are commonly implemented in computer-based machines. Accordingly, computer programs having computer-readable program codes are loaded in computer-based machines of telecommunications systems, causing them to behave according to a predefined manner, as determined by the specific program codes, which is in accordance to their specific functionality. Thus, those skilled in creating and/or modifying computer programs, would, without departing of the teachings of the present invention, readily apply them to create and/or modify computer programs which, when executed in a computer-based provisioning controller 21, would make it to behave according to any of the described embodiments.

The invention has been described in respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method for controlling a provisioning process for a telecommunication service, comprising the steps of:
   receiving a provisioning order from a first provisioning entity,
   determining whether a received provisioning order is an incomplete provisioning order,
   in response to determining the received provisioning order is an incomplete provisioning order, selecting a second provisioning entity among a plurality of second provisioning entities to provide further provisioning data for the received provisioning order, wherein the selecting further comprises
      checking a service provisioning template in relationship with the received provisioning order, the service provisioning template comprising an identifier of a second provisioning entity that can supply further provisioning data for the received provisioning order, and
      wherein the service provisioning template further comprises sequencing information to determine, either or both:
         the order for sending requests to obtain further provisioning data to the plurality of second provisioning entities, and
         the order for sending provisioning orders derived from the received provisioning order,
   in response to selecting the second provisioning entity, sending, according to the sequencing information, a request to the second provisioning entity for obtaining further provisioning data for the received provisioning order, and
   receiving a response to said request, wherein the response comprises further provisioning data,
   sending, according to the sequencing information, a second provisioning order derived from the received provisioning order to at least one provisioned entity, wherein the second provisioning order comprises the further provisioning data.

2. The method of claim 1, wherein the service provisioning template further comprises an identifier of a provisioning data that can be obtained from the second provisioning entity, and wherein the step of sending a request to a second provisioning entity comprises the step of sending said request comprising information to identify said provisioning data.

3. The method of claim 1, further comprising the step of updating a status register according to the processing status of the provisioning process started by a received provisioning order.

4. The method of claim 1, further comprising the step of sending information about the processing status of the provisioning process started by a received provisioning order to a provisioning or provisioned entity involved in the provisioning process.

5. Apparatus for controlling a provisioning process for a telecommunication service, comprising:
   a communications module for receiving a provisioning order from a first provisioning entity, and
   a processing module for processing a received provisioning order so as to prompt the communications module to send a second provisioning order derived from the received provisioning order to at least one provisioned entity;
   wherein the processing module is further arranged to:
      determine whether a received provisioning order is an incomplete provisioning order,
      select a second provisioning entity, among a plurality of second provisioning entities, to provide further provisioning data for the received provisioning order, responsive to determining the received provisioning order is an incomplete provisioning order, wherein selecting the second provisioning entity further comprises
         check a service provisioning template in relationship with the received provisioning order, the service provisioning template comprising an identifier of a second provisioning entity that can supply further provisioning data for the received provisioning order, and
         wherein the service provisioning template further comprises sequencing information to determine, either or both:
            the order for sending requests to obtain further provisioning data to the plurality of second provisioning entities, and
            the order for sending provisioning orders derived from the received provisioning order,
      prompt the communications module to send, according to the sequencing information, a request to the second provisioning entity for obtaining further provisioning data for the received provisioning order, and, responsive to a response to said request, wherein the response comprises further provisioning data,
      prompt said communications module to send, according to the sequencing information, the second provisioning order derived from the received provisioning order to at least one provisioned entity, wherein the second provisioning order comprises the further provisioning data.

6. The apparatus of claim 5, wherein said service provisioning template further comprises an identifier of a provisioning data that can be obtained from the second provisioning entity, and wherein the processing module is arranged to prompt the communications module to send the request to the second provisioning entity comprising information to identify the provisioning data.

7. The apparatus of claim 5, further comprising a status register, wherein the processing module is arranged to update said register according to the processing status of the provisioning process started by the received provisioning order.

8. The apparatus of claim 5, wherein the processing module is arranged to prompt the communications module to send information about the processing status of the provisioning process started by the received provisioning order to a provisioning or provisioned entity involved in said provisioning process.

* * * * *